United States Patent [19]

Spargo et al.

[11] Patent Number: 4,892,417
[45] Date of Patent: Jan. 9, 1990

[54] ELASTOMERIC MOUNT FOR THRUST BEARING SHOE

[75] Inventors: John D. Spargo; Joseph W. White, both of Annapolis, Md.

[73] Assignee: The United States of America as represented by the United States Department of the Navy, Washington, D.C.

[21] Appl. No.: 292,132

[22] Filed: Dec. 30, 1988

[51] Int. Cl.⁴ .............................................. F16C 39/04
[52] U.S. Cl. .................................... 384/99; 384/122; 384/124; 384/138
[58] Field of Search ....................... 384/8, 10, 99, 122, 384/306, 138, 124

[56] References Cited

U.S. PATENT DOCUMENTS

| 4,073,549 | 2/1978 | Christ et al. | 384/122 |
| 4,099,802 | 7/1978 | Heinemann et al. | 384/122 |
| 4,749,282 | 6/1988 | Spargo et al. | 384/10 |

*Primary Examiner*—Lenard A. Footland
*Attorney, Agent, or Firm*—Luther A. Marsh; John H. Stowe

[57] ABSTRACT

An elastomeric mount for a thrust bearing shoe comprising a piston fluidly operative in a platform cavity, the piston isolated and sealed from the cavity by an elongated elastomeric bearing-seal. The piston lockingly engages a thrust shoe with a compound dovetail connection whereby the shoe may be installed and removed after the piston and elastomeric bearing-seal are bonded into the platform cavity.

4 Claims, 2 Drawing Sheets

ELASTOMERIC MOUNT FOR THRUST BEARING SHOE

BACKGROUND OF THE INVENTION

1. Field of the Invention

The invention relates generally to thrust bearings of the type that are intended to bias axial movement from a rotating collared shaft and more particularly to a two part thrust bearing button where a piston is sealedly and affixedly attached in an oil pressure cell ring and a thrust shoe is removably attached to the piston.

2. Background Information

Thrust bearings employing hydrostatically activated buttons or shoes in various forms are already known and disclosed in the prior art. One form of hydrostatic button bearing as well as as uses for such bearings is shown in U.S. Pat. No. 4,749,282 to Spargo and White. Therein a seal comprising alternating metallic and elastomeric rings seals the button bearing from the foundation pocket. While one form of button disclosed is a two piece button, the button cannot be disassembled from the piston without removing the button piston combination from the foundation pocket. Additionally, the button therein is sealed in a manner such that the sal must be broken in order to inspect the button for wear or in order to replace a worn button. There is a need for a hydrostatic button-piston combination wherein the button can be replaced without disturbing the seal between the piston and the foundation pocket. There is a further need for a hydrostatic piston button combination wherein the piston can be bonded to the seal and the seal can be bonded into the foundation pocket whereby the separate functions of seal and supporting mechanism for the piston are combined.

SUMMARY OF THE INVENTION

In the present invention, a bearing for applying axial thrust to a collared shaft rotating within a platform, a cell ring is affixedly attached to a stationary platform. An internal cavity of the cell ring is in fluid communication with a source of pressurized fluid. An external diameter of the piston concentrically operates within the internal diameter of the cell ring cavity. The space between the internal cell ring cavity and the external diameter of the piston is filled with an elongated elastomeric bearing-seal which provides both positional support and fluid sealing. A thrust bearing shoe is lockedly engaged with the piston, preferably with a dovetail connection. Preferably, the elongated elastomeric bearing-seal is adhesively bonded between the piston and the cell ring.

It is an object of this invention to provide a thrust bearing arrangement whereby the piston can be bonded into the cell ring to ensure better sealing against unwanted leakage of the pressurized fluid.

It is a further object of this invention to provide a thrust bearing shoe which can be replaced without removal of the piston to which it is attached.

DETAILED DESCRIPTION OF THE INVENTION

Figure 1:
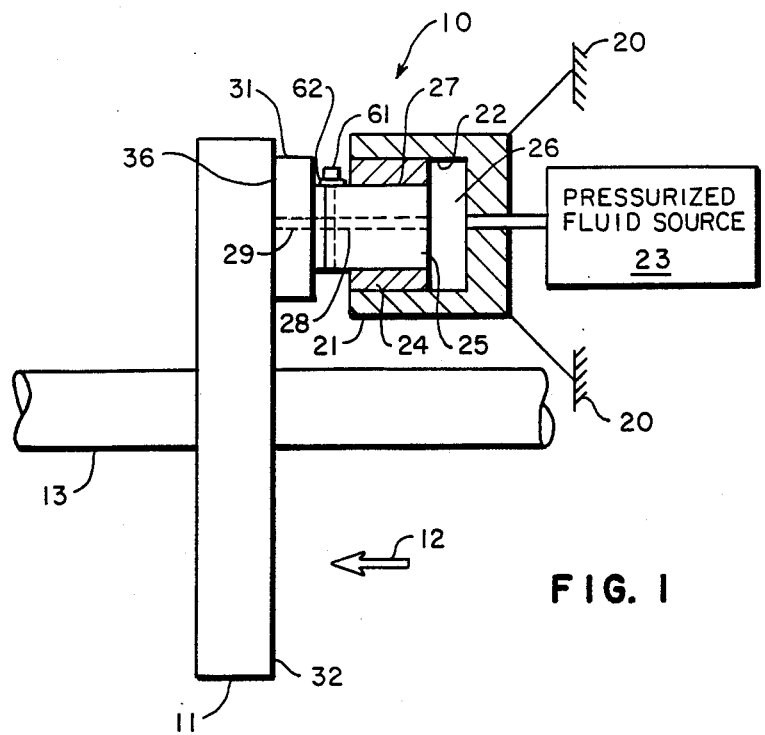
FIG. 1, partially in section, is a side elevation showing one of a plurality of thrust shoes adapted for use in association with a thrust collar.

In the present invention, a bearing for applying axial thrust to a collared shaft rotating within a platform, a cell ring is affixedly attached to the platform. An internal diameter of the cell ring is in fluid communication with a source of pressurized fluid. An external diameter of the piston concentrically operates within the internal diameter of the cell ring. The space between the cell ring is sealed with an elongated elastomer sleeve. A bearing shoe is lockedly engaged with the piston, preferably with a compound dovetail connection. Preferably, the elongated elastomeric sleeve is adhesively bonded both to the piston and to the cell ring.

Referring now to the various figures wherein like numerals represent like parts throughout the drawings, a preferred embodiment of an elastomeric mounted thrust bearing shoe is illustrated generally as 10. The purpose of the thrust bearing shoe according to the present invention is to provide an axial thrust to thrust collar 11 in the direction of arrow 12. Thrust collar 11 is in turn affixedly attached to shaft 13 by conventional means such as clamping or keying. The application of thrust prevents axial shifting of the shaft when rotation of the shaft is begun. For the purpose of the description of this invention, shaft 13 is rotatable within a platform illustrated schematically as 20. One or a number of cell rings are affixedly attached to platform 20 by conventional means such as bolting or clamping. Cell ring 21 has internal diameter 22 which is fluidly connected to a source of pressurized fluid 23 in a conventional manner. Disposed in internal diameter 22 is an elongated elastomeric bearing-seal 24. The term bearing-seal is used to describe the combined function of a bearing and a seal. This is, bearing-seal 24 maintains piston 25 in general coaxial alignment with internal diameter 22 and seals cavity 26 to prevent pressurized fluid flowing from fluid source 23 from escaping the joint between piston 25 and cavity 26. Cavity 26 is the volume within cell ring 21 which volume is not occupied by either piston 25 or elastomeric bearing-seal 24. Piston 25 has an external diameter 27 which is disposed substantially concentric with internal diameter 22 of cell ring 21. Elongated elastomeric bearing-seal 24 is disposed along external diameter 27 of piston 24 and is preferably affixed to piston 25 by adhesive bonding. Similarly, elongated elastomeric bearing-seal 24 is disposed along internal diameter 22 of cell ring 21 and is likewise preferably affixed to cell ring 21 by adhesive bonding. The material for bearing-seal 24 is selected for compatibility with the fluid entering cavity 26 and to provide sufficient strength or elongation to allow axial motion in the direction of arrow 12. Bearing-seal 24 is generally cylindrical in shape having a length at least twice as long as its radial thickness.

Figures 2, 3:
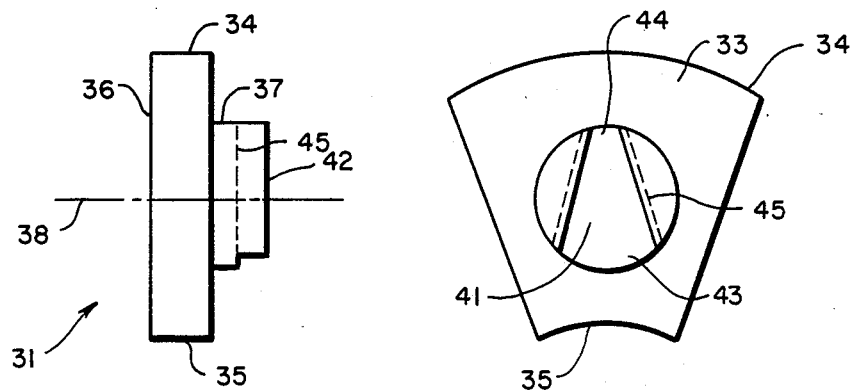
FIG. 2 is a side view of the thrust shoe shown in FIG. 1
FIG. 3 is an end view detail of the thrust shoe shown in FIG. 1
Figure 4:
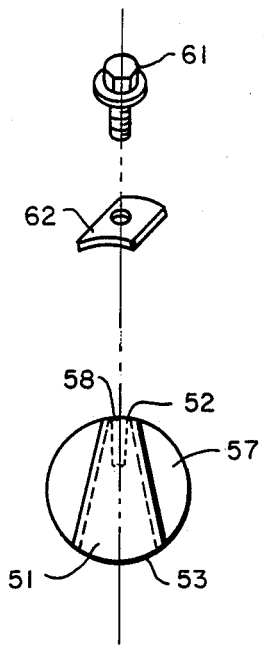
FIG. 4 is an end view of the piston shown in FIG. 1.
Figure 5:
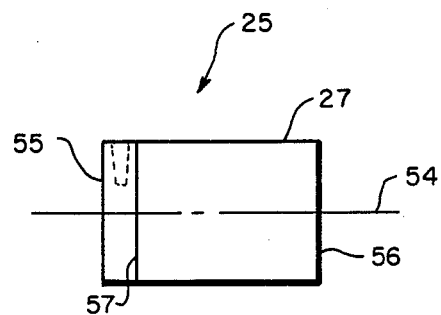
FIG. 5 is a side view of the piston shown in FIG. 1.

Thrust shoe 31 is removably attached to piston 25 such that thrust shoe 31 may be assembled onto piston 25 after piston 25 is installed within bearing-seal 24 and cell ring 21. This arrangement allows for the initial installation and subsequent replacement of thrust shoe 31 without removal of cell ring 21 from platform 20. Preferably, piston 25 has a fluid port 28 and shoe 31 has a fluid port 29 for communicating a portion of the fluid from cavity 26 to lubricate collar face 32 and bearing surface 36 of shoe 31. Referring now to FIG. 2 and FIG. 3, two views of thrust shoe 31 is detached from piston 25 are shown. Thrust shoe 31 has a body portion 33 having radially outward surface 34 and a radially inward surface 35. Thrust shoe 31 further has a thrust bearing surface 36 which, as shown in assembly in FIG. 1, is thrustedly contacting the face 32 of collar 11 when fluid is pressurized into cavity 26. Shank portion 37 of thrust shoe 31 has a central axis 38 substantially orthogonal with the plane of thrust bearing surface 36. Shank 37 is adapted with compound dovetail recess 41 and has a shank face 42 lying in a plane substantially parallel with the plane of thrust bearing surface 36. Dovetail recess 41 has a radially inward opening 43 disposed nearest radially inward surface 35 and radially outward opening 44 disposed nearest radially outward surface 34 and dovetail recess 41 is undercut so that a cross sectional area of dovetail recess 41 taken parallel to thrust bearing surface 36 is increasingly larger with progression from shank face 42 when progressing in planes perpendicular with central axis 38, continuing to the bottom 45 of dovetail cavity 41.

Piston 25 is substantially cylindrical over the length of external diameter 27 which is engaged with bearing-seal 24. A portion of piston 25 is adapted with compound dovetail projection 51. Dovetail projection 51 has a wide terminus end 53 which is usually oriented in assembly to be nearest the shaft 31 and a narrow terminus end 52 oppositely disposed from terminus end 53. Cylindrical portion 27 of piston 25 has a central axis 54. Projection face 55 of dovetail projection 51 is substantially in a plane orthogonal with central axis 54 of piston 25 and generally parallel with the plane of piston inward face 56. Dovetail projection 51 is undercut so that the cross sectional area is decreasingly smaller with progression from projection face 55 when progressing in planes parallel with projection face 55, continuing until step face 57 of piston 25 is reached. Dovetail projection 51 has tapped hole 58 in narrow terminus end 52. Tapped hole 58 is substantially perpendicular to piston axis 54. Dovetail recess 41 slidingly receives dovetail projection 51 for engaging piston 25 with thrust shoe 31. In assembly, thrust shoe 31 is retained integral with piston 25 by curved washer 62 and locking screw 61.

Many obvious modifications in the details and arrangement of parts may be made, however, without departing from the true spirit and scope of the invention, as more particularly defined in the appended claims.

What is claimed is:

1. A bearing for applying axial thrust to a collared shaft rotating within a stationary platform, comprising:
    a source of pressurized fluid;
    a cell ring affixedly attached to said stationary platform, said cell ring having an internal cavity in internal communication with said source of pressurized fluid, said cavity having an internal diameter;
    a piston in fluid communication with said source of pressurized fluid, said piston having an external diameter disposed radially inward from said internal diameter of said cavity within said cell ring, said piston having a portion of the length of said piston disposed concentric with said internal diameter of said cell ring;
    an elongated elastomeric bearing-seal adhesively bonded between said internal diameter of said cavity of said cell ring and said concentric portion of said piston; and,
    a thrust bearing shoe lockedly engaged with said piston, said thrust bearing shoe axially thrusting said collar under influence of pressure from said pressurized fluid.

2. A bearing for applying axial thrust to a collared shaft rotating within a stationary platform as claimed in claim 1 wherein said piston has a passageway in fluid communication with said source of pressurized fluid and said thrust bearing shoe has a passageway in fluid communication with said passageway in said piston and in fluid communication with a face of the collar on said shaft, whereby a portion of fluid from said pressurized source lubricates said face of said collar.

3. A bearing for applying axial thrust to a collared shaft rotating within a stationary platform, comprising:
    a source of pressurized fluid;
    a cell ring affixedly attached to said stationary platform, said cell ring having an internal cavity in internal communication with said source of pressurized fluid, said cavity having an internal diameter;
    a piston in fluid communication with said source of pressurized fluid, said piston having an external diameter disposed radially inward from said internal diameter of said cavity within said cell ring, said piston having a portion of the length of said piston disposed concentric with said internal diameter of said cell ring;
    an elongated elastomeric bearing-seal interposed between said internal diameter of said cavity of said cell ring and said concentric portion of said piston; and,
    a thrust bearing shoe lockedly engaged with said piston with a dovetail connection, said dovetail connection further comprising a dovetail projection on said piston and a dovetail recess on said shoe for receiving said dovetail projection, said thrust bearing shoe axially thrusting said collar under influence of pressure from said pressurized fluid.

4. A bearing for applying axial thrust to a collared shaft rotating within a stationary platform as claimed in claim 3 wherein said piston has a passageway in fluid communication with said source of pressurized fluid and said thrust bearing shoe has a passageway in fluid communication with said passageway in said piston in fluid communciation with a face of the collar on said shaft, whereby a portion of fluid from said pressurized source lubricates said face of said collar.

* * * * *